United States Patent [19]

Asakura et al.

[11] 4,328,774
[45] May 11, 1982

[54] DEVICE FOR CONTROLLING NEGATIVE PRESSURE IN SUCTION PIPE OF INTERNAL COMBUSTION ENGINE

[75] Inventors: Masamitsu Asakura; Tomo Ito; Chiaki Niida, all of Katsuta, Japan

[73] Assignee: Hitachi, Ltd., Tokyo, Japan

[21] Appl. No.: 89,092

[22] Filed: Oct. 29, 1979

[30] Foreign Application Priority Data

Oct. 31, 1978 [JP] Japan ................... 53-134751

[51] Int. Cl.³ .............................. F02D 33/00
[52] U.S. Cl. .................... 123/327; 123/389; 261/DIG. 19
[58] Field of Search ............ 123/319, 320, 327, 328, 123/378, 389, 391; 251/61.2-61.5; 261/DIG. 19

[56] References Cited

U.S. PATENT DOCUMENTS

| | | | |
|---|---|---|---|
| 2,211,336 | 8/1940 | Linder | 123/327 |
| 3,852,391 | 12/1974 | Hisatomi et al. | 123/328 |
| 3,866,583 | 1/1975 | Pundt et al. | 261/DIG. 19 |
| 4,182,291 | 1/1980 | Ito | 251/61.4 |

Primary Examiner—Craig R. Feinberg
Attorney, Agent, or Firm—Craig & Antonelli

[57] ABSTRACT

A suction pipe is provided to suck and introduce air from its one end and is connected at its other end to an internal combustion engine. The suction pipe is provided at its one end with a venturi portion and a throttle valve. A first negative pressure detector is provided to detect the negative pressure at the portion of the suction pipe remote from the internal combustion engine, so as to sense a comparatively gentle pressure rise in the suction pipe. A control valve is provided to be opened and closed in accordance with the output from the first negative pressure detector, thereby to control the flow rate of air supplied into the suction pipe. A second negative pressure detector is provided to detect the negative pressure at a portion of the suction pipe remote from the internal combustion engine, so as to sense an abrupt increase of the negative pressure in the suction pipe. This second negative pressure detector is disposed between the first valve and the first negative pressure detector and adapted to produce an output in accordance with which the first valve is controlled.

6 Claims, 1 Drawing Figure

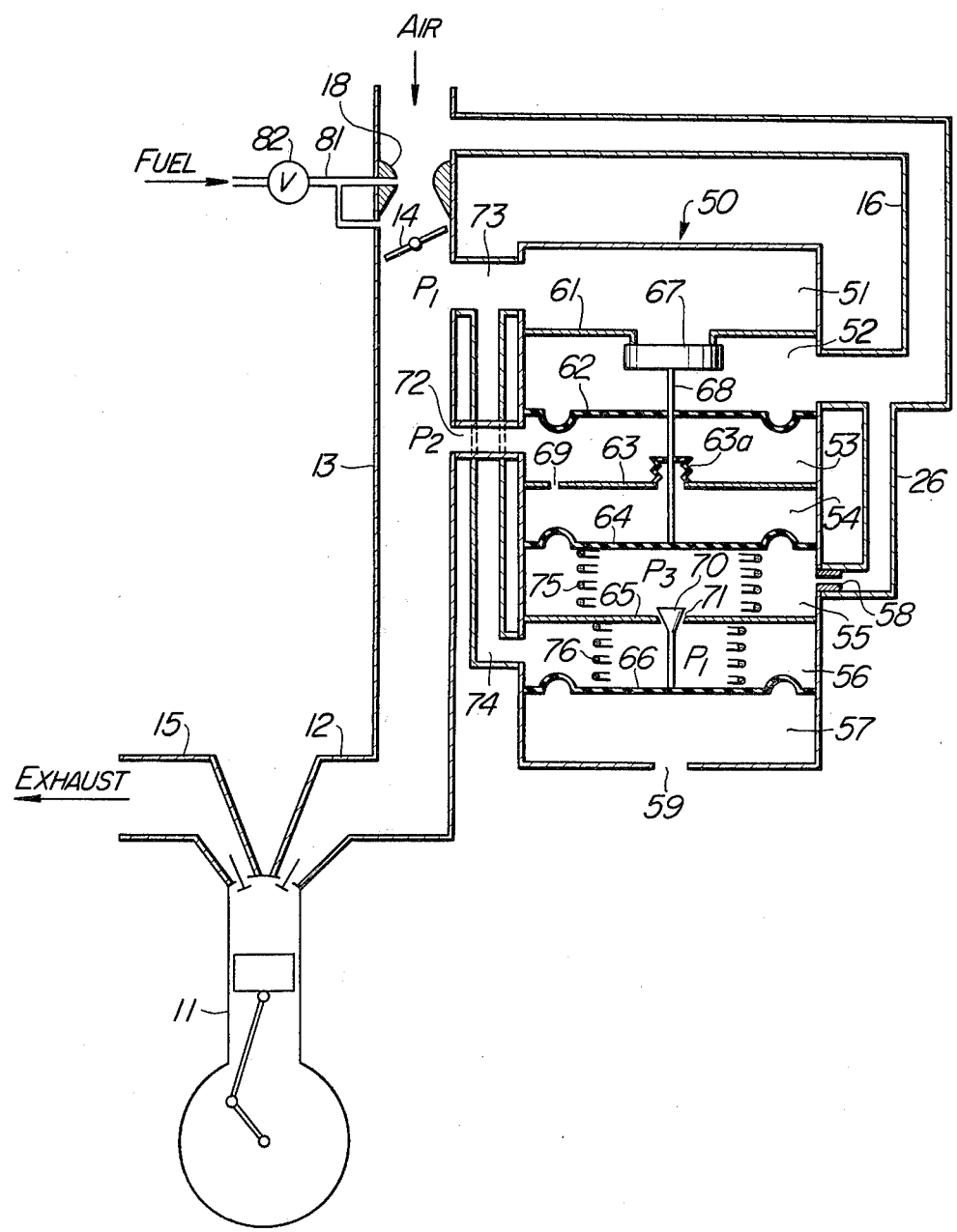

DEVICE FOR CONTROLLING NEGATIVE PRESSURE IN SUCTION PIPE OF INTERNAL COMBUSTION ENGINE

BACKGROUND OF THE INVENTION

The present invention relates to a device for controlling a negative pressure in a suction pipe of an internal combustion engine.

Generally, the level of negative pressure in the suction pipe of an internal combustion engine is increased during deceleration of the engine to adversely affect an air-fuel ratio of the mixture, resulting in an increase of carbon monoxide component in the exhaust gas emitted from the engine.

As a countermeasure for overcoming this problem, Japanese Utility Model Publication No. 52-21411 entitled "A device for controlling exhaust gases during deceleration of engine" discloses a device for controlling the exhaust gas having a negative pressure control device adapted for introducing air into the air-fuel mixture at the downstream side of the throttle valve.

It is often experienced that the level of negative pressure in the suction pipe of an internal combustion engine is abruptly increased during deceleration of the engine to cause an excessive enrichment of the mixture. That is, a large amount of fuel is sucked into the engine in quite a short time of period. As a result, surplus fuel which can not be burnt in the combustion chamber of the engine is released into the exhaust pipe to be mixed with air in the outlet manifold, thereby causing an explosive combustion therein. This phenomenon is usually referred to as "after burning". At this time, carbon monoxide in the exhaust gas is suddenly increased.

In order to effectively prevent such after burning, it is necessary to mount an after burn valve in the suction pipe of the engine.

The "negative pressure device" disclosed in Japanese Patent Laid-Open Publication No. 52-115916 is a typical example of an after burn valve used for this purpose.

Thus, in order to maintain an adequate air-fuel ratio of the mixture during deceleration of the engine, it is necessary to use two separate devices comprising a negative pressure control device and an after burn valve.

SUMMARY OF THE INVENTION

It is an object of the invention to provide a device for controlling a negative pressure in the suction pipe of an internal combustion engine which has a simple construction and is capable of preventing an increase of carbon monoxide content in the exhaust gas emitted from the internal combustion engine even when the negative pressure in the suction pipe of the engine is fluctuated.

It is another object of the invention to provide a device for controlling a negative pressure in the suction pipe of an internal combustion engine, which serves to prevent the after burning from taking place.

To these ends, according to the invention, there is provided a negative pressure control device having therein a second negative pressure detector adapted to detect an abrupt change of the level of negative pressure in the portion of the suction pipe near the internal combustion engine. This second negative pressure detector serves to detect an after burning, and to actuate a control valve disposed in the negative pressure control device. This arrangement permits simplification of the construction of the negative pressure control device for controlling the negative pressure in the suction pipe of an internal combustion engine, and reduction in the size of the same.

BRIEF DESCRIPTION OF THE DRAWINGS

FIG. 1 is a sectional view of a negative pressure control device embodying the present invention and other associated devices.

DESCRIPTION OF THE PREFERRED EMBODIMENT

Referring to the drawings showing an embodiment of the invention, an internal combustion engine 11 has an intake manifold 12 and an outlet manifold 15. A suction pipe designated by reference numeral 13 serves to introduce the air therethrough from one end thereof, as shown by an arrow. The suction pipe 13 is connected at its other end to the internal combustion engine 11 through the medium of the intake manifold 12.

The suction pipe 13 is provided at its one end with a venturi portion 18 which serves to increase flow velocity of air sucked into the engine as the latter operates.

The venturi portion 18 is supplied with a fuel such as gasoline through a gasoline supply pipe 81 which is provided with a valve 82. The valve 82 is adapted to be controlled by an electric signal which is related to vehicle speeds, position of the throttle valve 14, position of the gear, position of the clutch and other factors.

The throttle valve 14 is provided for controlling the flow rate of the mixture of air and fuel, i.e. gasoline, which has passed the venturi section, into the internal combustion engine 11, and is operatively connected to an accelerator pedal (not shown). A reference numeral 50 designates a negative pressure control device constructed in accordance with the invention of this application. The negative pressure control device 50 has a first negative pressure chamber 51 which is communicated through a passage 73 with a portion of the suction pipe 13 remote from the internal combustion engine 11 to introduce the negative pressure existing at that portion of the suction pipe 13.

The negative pressure control device 50 is provided also with a first atmospheric chamber 52 adapted to receive air through an air introduction passage 16. A second negative pressure chamber 53 is communicated through a first negative pressure passage 72 with a portion of the suction pipe 13 near the internal combustion engine 11 so as to receive the negative pressure existing at that portion of the suction pipe. A surge tank 54 is adapted to preserve the negative pressure which is transmitted thereto through a small aperture 69 from the suction pipe 13.

A second atmospheric chamber 55 is adapted to receive air through a restriction 58 provided in a passage 26 branching away from the air introduction passage 16, while a third negative pressure chamber 56 is adapted to receive the negative pressure existing at the portion of the suction pipe 13 remote from the internal combustion engine 11 through a second negative pressure passage 74 branching away from the passage 73.

A third atmospheric chamber 57 is communicated with the atmosphere through an air introduction port 59.

The first atmospheric chamber 52 is separated from the first negative pressure chamber 51 by a first partition plate 61 provided with a central bore while the second negative pressure chamber 53 is separated from the first atmospheric chamber 52 by a first diaphragm 62. Also, the second atmospheric chamber 55 is separated from the surge tank 54 by means of a second diaphragm 64 while the third negative pressure chamber 56 is separated from the second atmospheric chamber 55 by a third partition plate 65 having a central orifice therein. Finally, the third atmospheric chamber 57 is separated from the third negative pressure chamber 56 by a third diaphragm 66.

A first valve 67 disposed in opposed relation with the central bore of the first partition plate 61 is securedly connected through a connecting member 68 to the central part of the first diaphragm 62, bellows 63a of the second partition plate 63, and to the central portion of the second diaphragm 64.

A second valve 70 attached to the central portion of the upper face of the third diaphragm 66 is disposed in opposed relation with the orifice 71 formed in the center of the third partition plate 65. The second valve 70 is adapted to be opened as the third diaphragm 66 is raised.

A first coiled compression spring 75 and a second coiled compression spring 76 are disposed between the third partition plate 65 and the second diaphragm 64, and between the third partition plate 65 and the third diaphragm 66, respectively.

The first and second diaphragms 62 and 64 have an equal area and equal resilient characteristic.

In order to avoid an abrupt increase of carbon monoxide in the exhaust gas during deceleration of the internal combustion engine, it is necessary to maintain the level of the negative pressure below a predetermined level $P_1$ in the suction pipe 13. This predetermined level of negative pressure is on the order of $-620$ mmHg in case of an internal combustion engine having an engine output of 70 HP.

The spring force of the second compression spring 76 is previously set to allow the second valve 70 to open when the level of the negative pressure is increased beyond the aforementioned predetermined level $P_1$.

As stated before, the first negative pressure chamber 51 and the third negative pressure chamber 56 are adapted to receive the negative pressure in the suction pipe 13 through the passage 73 and the second negative pressure passage 74, respectively. As the engine is decelerated and the negative pressure in the suction pipe 13 is increased gradually to a level above the aforementioned level $P_1$, the second compression spring 76 acts to allow the second valve 70 to open, which in turn permits such negative pressure to be transmitted also to the second atmospheric chamber 55 which receives also the atmospheric pressure through the restriction 58.

The area of this restriction 58, however, is smaller than the area of the opening formed between the second valve 70 and the orifice 71 of the third partition plate 65. Therefore, the pressure in the second atmospheric chamber 55 is affected by the negative pressure in the suction pipe 13 transmitted thereto through the orifice 71 rather than by the atmospheric pressure transmitted through restriction 58. As a result, a negative pressure of a level $P_3$ somewhat lower than that of the suction negative pressure $P_1$ is established in the second atmospheric chamber 55.

As the pressure in the second atmospheric chamber 55 comes down below the atmospheric pressure, the second diaphragm 64 acts to lower the first valve 67 connected to the connecting member 68 against the force of the first compression spring 75 to open the latter, thereby supplying the air into the suction pipe 13.

Representing the spring force of the first compression spring 75 and the effective pressure receiving area of the second diaphragm 64 by $F_1$ and $Da$, respectively, the first valve 67 is allowed to open at the suction negative pressure $P_1$, assuming that the spring force $F_1$ is determined so as to satisfy the following equation (1).

$$F_1 = P_1 Da \qquad (1)$$

Namely, when the negative pressure $P_1$ gets greater than $F_1/Da$, the first valve 67 is opened by a force which is given by $P_1 \times Da - F_1$.

The negative pressure $P_3$ is proportional to the negative pressure $P_1$. Representing the proportion constant by K, the above equation (1) is transformed into the following equation (2).

$$F_1 = K P_3 Da \qquad (2)$$

The proportion constant K is determined by various factors such as the size of the small aperture 69, the first compression spring 75, shape of the second valve 70 and so forth.

As the level of the negative pressure in the suction pipe 13 is increased comparatively gradually during deceleration of the engine to reach the afore-mentioned predetermined level $P_1$, this negative pressure $P_1$ is introduced into the second negative pressure chamber 53 through a first negative pressure passage 72. This negative pressure $P_1$ is introduced into the surge tank 54 through the small aperture 69. Therefore, no pressure difference is produced between the second negative pressure chamber 53 and the surge tank 54, so that any deflection of the first diaphragm 62 due to any pressure difference does not take place. Accordingly, the first valve 67 is not opened.

Assuming that the aforementioned predetermined level of the suction negative pressure $P_1$ is $-620$ mmHg and that the suction negative pressure in the suction valve has been increased rather gently to the level of $-700$ mmHg in 40 seconds after the commencement of the deceleration. The second valve 70 is opened to allow the first valve 67 to open, so that the air is introduced into the suction pipe 13 to prevent abrupt increase of carbon monoxide in the exhaust gas.

Supposing that the level of the negative pressure in the suction pipe 13 is lowered to $-500$ mmHg as a result of opening of the first valve 67, the second valve 70 is closed without delay and the atmospheric air is introduced into the second atmospheric chamber 55 through the restriction 58, so that the pressure in the second atmospheric chamber 55 is increased to the atmospheric pressure. Thus, the first valve 67 is pushed up by the force of the first spring 67 since the pressure in the first and second atmospheric chambers 52 and 55 are equal. As a result, the introduction of air into the suction pipe 13 is interrupted.

Hereinafter, description will be made as to how the device of the invention operates in case of an after burning which takes place when the suction negative pressure is increased abruptly.

It is assumed here, by way of example, that the suction negative pressure $P_o$ is maintained at $-100$ mmHg in the steady state of engine operation and is increased abruptly to the level of negative pressure $P_2$ which is $-500$ mmHg, to form an excessively rich mixture. Such a situation takes place, for example, when the engine which has been accelerated is abruptly decelerated. As a precursor of this phenomenon, such a condition takes place that the negative pressure $P_2$ at the portion of the suction pipe 13 near the internal combustion engine 12 becomes higher than the steady negative pressure $P_o$ at the portion of the suction pipe 13 remote from the internal combustion engine 11. In this state, the level of negative pressure in the first negative pressure passage 72 becomes higher than that in the second negative pressure passage 74.

In the surge tank 54, however, the low steady negative pressure $P_o$ is preserved due to a restricting action of the small aperture 69, so that the first diaphragm 62 is therefore lowered. Since the level of negative pressure in the second negative pressure chamber 53 is higher than that in the surge tank 54, the lowering of the first diaphragm 62 is not hindered. The first diaphragm 62 then opens the first valve 67 through a portion of the connecting member 68 which connects the central portion of the first diaphragm 62 and the first valve 67, thereby to supply air into the suction pipe 13.

As the time lapses, the level of negative pressure in the surge tank 54 is increased to raise the second diaphragm 64. Then, the upward force of the second diaphragm 64 comes to balance the downward force of the first diaphragm 61, so that the first valve 67 is moved to the closing position.

Thus, when the level of the negative pressure in the suction pipe 13 is drastically increased in quite a short period of time, the first valve 67 is opened for a short period of time irrespective of the second valve 70, thereby to supply the suction pipe 13 with the air. The length of time elapsing until the pressure in the second negative pressure passage 53 and in the surge tank 54 are equalized, i.e. the time length while the first valve 67 is kept closed is determined depending on the size of the small aperture 69.

The negative pressure control device of the invention for controlling the negative pressure in the suction pipe of an internal combustion engine is contemplated to have the first air introduction passage 16, first negative pressure chamber 51, first valve 67 and the connecting member 68 for common use. Owing to such arrangement, it is possible to unitarize or integrate the conventional negative pressure control device and the conventional after burn valve. To this end, according to the invention, the second negative pressure detector for detecting an abrupt change of the negative pressure in the suction pipe 13, constituted by the second negative pressure chamber 53 and the surge tank 54, is interposed between the first atmospheric chamber 52 and the second atmospheric chamber 55.

This arrangement permits to simplify the construction of the mechanism for transmitting the output of the second negative pressure detector to the first valve 67. Namely, in the device of the invention, the first negative pressure detector and the second negative pressure detector make a common use of the mechanism, that is, the connecting member 68 for transmitting the output of the first negative pressure detector to the first valve 67, which mechanism is constituted by the second atmospheric chamber 55 and the third negative pressure chamber 56. To this end, it suffices to connect the center portion of the first diaphragm 62 to the connecting member 68.

It is appreciated that, according to the invention, a simple and small-sized device for controlling the negative pressure in the suction pipe of an internal combustion engine, is capable of functioning also as device for preventing the undesirable after burning from taking place.

What is claimed is:

1. A device for controlling negative pressures in a suction pipe of an internal combustion engine comprising a first negative pressure detector for detecting a comparatively gradual increase of the negative pressure of an air-fuel mixture at a first location within said suction pipe, and a first valve for introducing air into said suction pipe in response only to detection of said gradual increase in negative pressure by said first negative pressure detector, a second negative pressure detector for detecting the negative pressure of the air-fuel mixture existing at a second location within said suction pipe, said second location being closer to said internal combustion engine than said first location, so as to sense an abrupt increase of the negative pressure of said air-fuel mixture in said suction pipe, and means for operating said first valve in response only to detection of said abrupt negative pressure increase by said second negative pressure detector for introducing air into said suction pipe.

2. A device as claimed in claim 1, wherein:
   (1) said second negative pressure detector comprises a second negative pressure chamber defined by a first diaphragm interconnected to said first valve, a partition plate having a small aperture therein and a negative pressure passage through which the negative pressure of said air-fuel mixture is introduced, said first diaphragm being adapted to operate to open said first valve when the negative pressure of said mixture in said suction pipe is abruptly increased, thereby introducing air into said suction pipe; and
   (2) a surge tank is separated from said second negative pressure chamber by said partition plate and disposed adjacent to said first negative pressure detector, such that the negative pressure in said surge tank is reduced when the negative pressure in said suction pipe is increased abruptly, thereby to actuate said first diaphragm.

3. A device as claimed in claim 1 or 2, further comprising:
   (1) a first negative pressure chamber having a passage for introducing air into said air-fuel mixture existing at said first location within said suction pipe; and
   (2) a first atmospheric chamber including a first partition plate formed with an air passage adjacent to said first negative pressure chamber and opposite to said first valve, whereby the flow rate of air introduced into said first negative pressure chamber is controlled by opening and closing of said first valve.

4. A device as claimed in claim 1 or 2, wherein said first negative pressure detector comprises:
   (1) an atmospheric chamber having a diaphragm interconnected to said first valve and a restriction for introducing air;
   (2) another negative pressure chamber separated from said atmospheric chamber by a partition plate provided at its central portion with an orifice, said other negative pressure chamber being provided with a negative pressure passage communicated with said passage;

(3) another atmospheric chamber separated from said other negative pressure chamber by another diaphragm and opened at its one end to the atmosphere;
(4) a first compression spring disposed between said second diaphragm and said partition plate;
(5) a second compression spring interposed between said partition plate and said other diaphragm; and
(6) a second valve fixed to the center of said other diaphragm in opposed relation with said orifice, and being adapted to open when said other diaphragm is deflected against the force of said second compression spring.

5. A device as claimed in claim 4, further comprising an air introduction passage supplying the air commonly to both of said first valve and said restriction of the atmospheric chamber having the first valve.

6. A device for controlling the negative pressure in the suction pipe of an internal combustion engine comprising:
(1) a first negative pressure chamber having an air passage for introducing air into the air-fuel mixture existing at the portion of said suction pipe remote from said internal combustion engine;
(2) a first atmospheric chamber having a first partition plate adjacent to said first negative pressure chamber and provided with an air introduction passage, and a first valve disposed in opposed relation with said air introduction passage, the flow rate of air introduced into said first negative pressure chamber being controlled by controlling the opening and closing of said first valve;
(3) a second negative pressure chamber separated from said first atmospheric chamber by a first diaphragm and having a negative pressure passage for introducing said air-fuel mixture from a portion closer to said internal combustion engine than said passage;
(4) a surge tank separated from said second negative pressure chamber by a second partition plate having a small aperture;
(5) a second atmospheric chamber separated from said surge tank by a second diaphragm and having a restriction for introducing air;
(6) connecting means connected airtightly to said central portion of said first diaphragm, and connected to said first valve and the central part of said second diaphragm;
(7) a third negative pressure chamber separated from said second atmospheric chamber by a third partition plate provided at its central portion with an orifice and having a negative pressure passage communicating with said air passage;
(8) a third atmospheric chamber separated from said third negative pressure chamber by a third diaphragm and opened to the atmosphere;
(9) a first compression spring interposed between said second diaphragm and said third partition plate;
(10) a second compression spring interposed between said third partition plate and said third diaphragm;
(11) a second valve fixed to the central portion of said third diaphragm in opposed relation with said orifice, and adapted to open when said third diaphragm is deflected against the force of said second compression spring.

* * * * *